United States Patent [19]
Dicks et al.

[11] Patent Number: 5,622,790
[45] Date of Patent: Apr. 22, 1997

[54] FUEL CELL AND CATALYST FOR USE THEREIN

[75] Inventors: Andrew L. Dicks, Ashby De La Zouch; Thomas A. Smith, Melton Mowbray; Stephen H. Clarke, Hugglescote Coalville, all of Great Britain

[73] Assignee: British Gas PLC, London, Great Britain

[21] Appl. No.: 570,635

[22] Filed: Dec. 11, 1995

[30] Foreign Application Priority Data

Dec. 9, 1994 [GB] United Kingdom ............ 9424886

[51] Int. Cl.⁶ .................................................. H01M 8/14
[52] U.S. Cl. ............................. 429/16; 429/40; 502/101
[58] Field of Search .................... 429/16, 40, 44, 429/45, 42; 502/101, 330; 427/115

[56] References Cited

U.S. PATENT DOCUMENTS

| | | |
|---|---|---|
| 3,488,226 | 1/1970 | Baker et al. . |
| 4,454,207 | 6/1984 | Fraioli et al. . |
| 4,467,050 | 8/1984 | Patel et al. . |
| 4,774,152 | 9/1988 | Matsumura et al. . |

FOREIGN PATENT DOCUMENTS

| | | |
|---|---|---|
| 0125846 | 11/1984 | European Pat. Off. . |
| 0173904 | 3/1986 | European Pat. Off. . |
| 0360554 | 3/1990 | European Pat. Off. . |
| 0459940 | 12/1991 | European Pat. Off. . |
| 1179033 | 1/1970 | United Kingdom . |
| 2222963 | 3/1990 | United Kingdom . |

*Primary Examiner*—Anthony Skapars
*Attorney, Agent, or Firm*—Oblon, Spivak, McClelland, Maier & Neustadt, P.C.

[57] ABSTRACT

A molten carbonate high temperature fuel cell contains a hydrocarbon-containing fuel reforming catalyst on a support, where the catalyst is produced by reducing a catalyst precursor which is prepared by intimately mixing a defined Feitnecht compound with a non-calcined alumino-silicate clay mineral and at the same time and/or subsequently but prior to calcination with at least one added stabilizing additive for reducing silicon-species loss selected from the group consisting of alkaline earth metal compounds, rare earth metal compounds and mixtures thereof, and, optionally, an alkali metal compound, and thereafter calcining the intimate mixture, wherein the catalyst has been found to be suitable for the steam reforming of methane at the working temperature of the molten carbonate fuel cell and has been found to be substantially resistant to deactivation in the hot alkali metal carbonate environment.

13 Claims, 2 Drawing Sheets

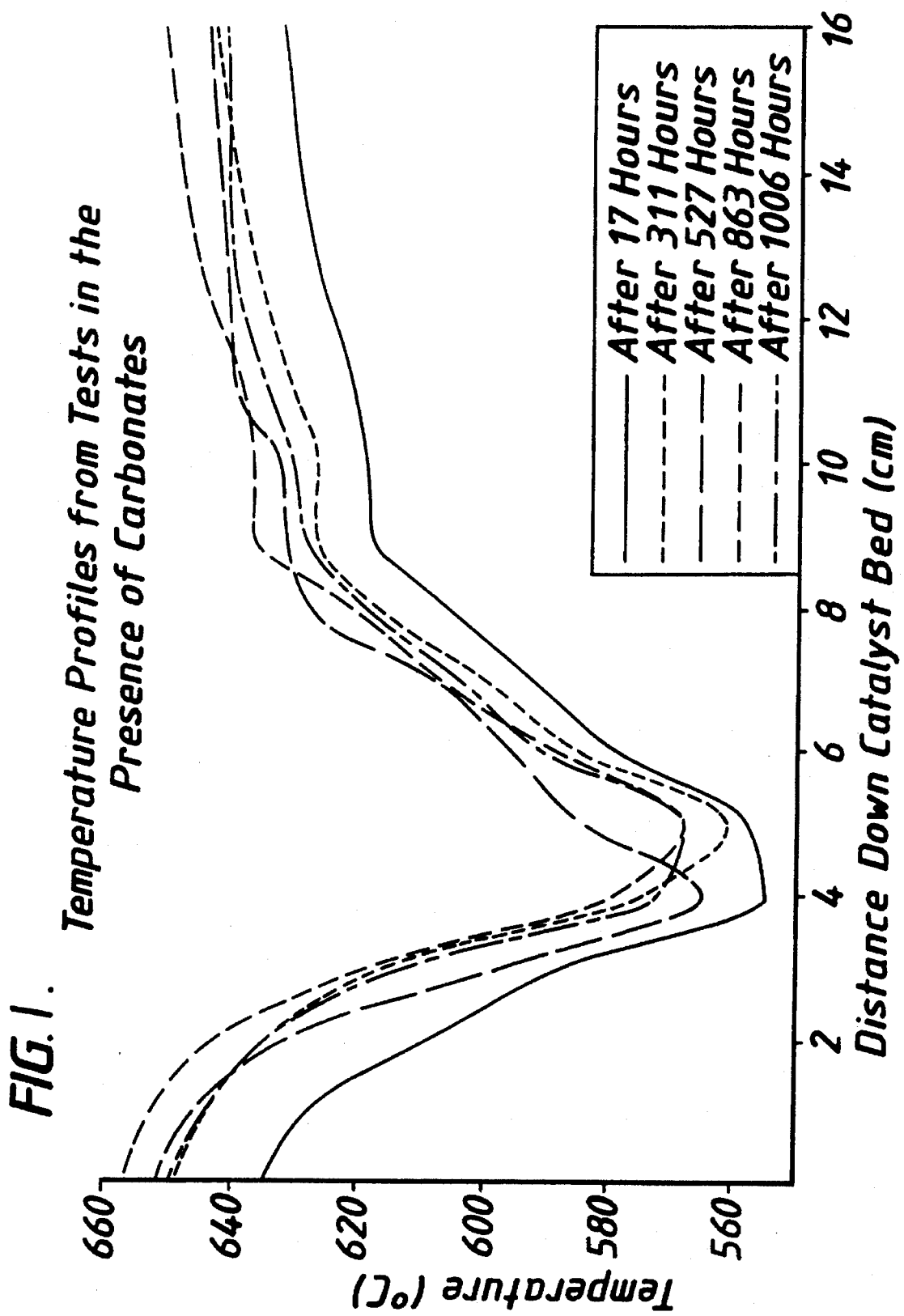

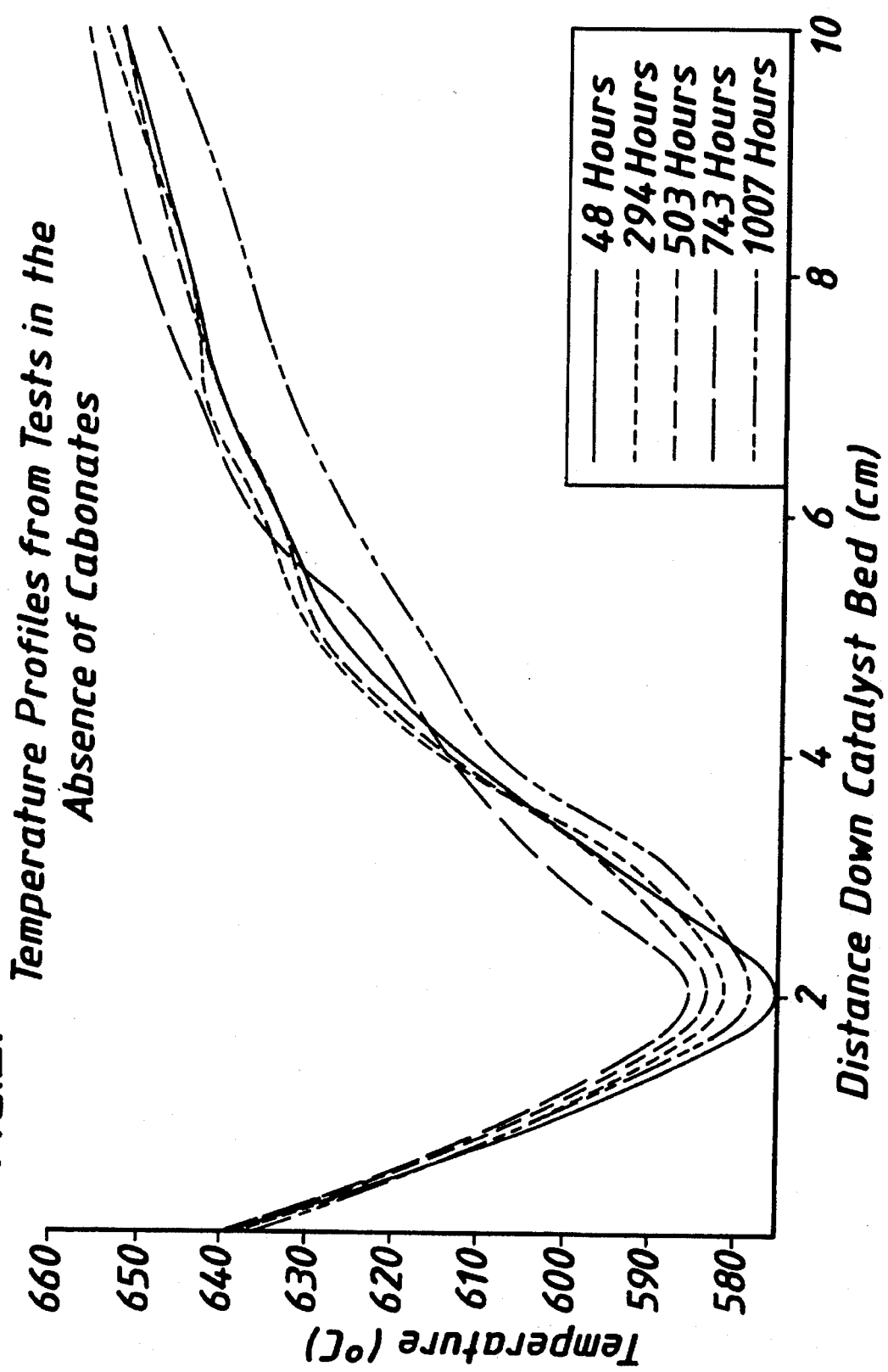

FUEL CELL AND CATALYST FOR USE THEREIN

BACKGROUND OF THE INVENTION

Field of the Invention

The present invention relates to fuel cells containing catalysts for reforming fuels.

Discussion of the Background

It is known that there have been proposals for processes for producing electric power employing molten carbonate fuel cells which are supplied with reformed fuel gas produced by a reformer which reforms a fuel gas comprising hydrocarbons.

Such a process may employ a separate reformer to reform a fuel gas (comprising hydrocarbons) to produce reformed fuel gas (comprising hydrogen and also carbon monoxide) which is fed to the fuel gas electrode side of the molten carbonate fuel cell. Thus, the process uses a reformer which is external to the fuel cell.

An alternative process, instead of using the separate reformer, employs a molten carbonate fuel cell containing a reforming catalyst. In this alternative process the fuel cell is of the so-called internally reforming kind and uses the heat and steam produced by the fuel cell to drive the endothermic reforming reaction. The fuel gas, comprising hydrocarbons, e.g. methane, is fed to the fuel cell and is steam reformed internally of the cell to produce required hydrogen-containing gas for use at the fuel gas electrode side of the fuel cell. The catalyst used for the reforming reactions can be placed within the fuel channel in the fuel cell stack. This eliminates the need for an external reformer, and thereby reduces the final cost of the electricity generating apparatus.

The catalyst inside the fuel cell should be both active for the steam reforming of the hydrocarbons, such as methane present in natural gas, at the working temperature of the molten carbonate fuel cell; and substantially resistant to deactivation in the atmosphere of hot alkali metal carbonates inside the cell to enable the fuel cell to be operated for a substantial length of time.

SUMMARY OF THE INVENTION

Accordingly, one object of the present invention is to provide a fuel cell which overcomes the above-noted deficiencies.

A further object of the present invention is to provide a catalyst for use in a fuel cell for reforming hydrocarbon fuels.

These and other objects of the present invention have been satisfied by the discovery of a molten carbonate high temperature fuel cell comprising a hydrocarbon-containing fuel reforming catalyst on a support, wherein the catalyst is produced by reducing a catalyst precursor, wherein the catalyst precursor is prepared by intimately mixing a Feitnecht compound having the formula:

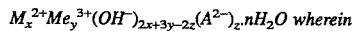

$M_x^{2+}Me_y^{3+}(OH^-)_{2x+3y-2z}(A^{2-})_z \cdot nH_2O$ wherein $Me^{2+}$ is substantially completely $Ni^{2+}$,
$Me^{3+}$ is substantially completely $Al^{3+}$ or substantially $Al^{3+}$ and $Cr^{3+}$, $A^{2-}$ is either a single divalent anion or two monovalent anions, x/y is from 1.5/1 to 4/1, z/(x+y) is from 0.05 to 0.2, and n/(x+y) is from 0.25 to 1.0, with a non-calcined alumino-silicate clay mineral and, at the same time or subsequently, or both, but prior to calcination, with at least one added stabilizing additive for reducing loss of silicon species selected from the group consisting of alkaline earth metal compounds, rare earth metal compounds, and mixtures thereof, and, optionally, an alkali metal compound, and calcining the intimate mixture.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein:

FIG. 1 is a graphical presentation of the temperature profile with respect to the catalyst bed in the reactor, in the presence of carbonates.

FIG. 2 is a graphical presentation of the temperature profile with respect to the catalyst bed in the reactor, in the absence of carbonates.

DETAILED DESCRIPTION OF THE PREFERRED EMBODIMENTS

The present invention relates to a molten carbonate high temperature fuel cell containing a hydrocarbon-containing fuel reforming catalyst on a support, wherein the catalyst is produced by reducing a catalyst precursor which is prepared by intimately mixing a Feitnecht compound having the general formula:

$M_x^{2+}Me_y^{3+}(OH^-)_{2x+3y-2x}(A^{2-})_z \cdot nH_2O$ wherein $Me^{2+}$ is substantially completely $Ni^{2+}$ $Me^{3+}$ is substantially completely $Al^{3+}$ or substantially $Al^{3+}$ and $Cr^{3+}$, $A^{2-}$ is either a single divalent anion or two monovalent anions, x/y is from 1.5/1 to 4/1, preferably between 1.5/1 and 4/1, z/(x+y) lies in the range 0.05 to 0.2, and n/(x+y) lies in the range 0.25 to 1.0, with a non-calcined alumino-silicate clay mineral and at the same time and/or subsequently but prior to calcination with at least one added stabilizing additive, for reducing the loss of silicon—species, selected from the group consisting of alkaline earth metal compounds, rare earth metal compounds, and mixtures thereof and, optionally, an alkali metal compound, and thereafter calcining the intimate mixture.

The fuel cell arrangement may be such that, when the fuel cell is operating, the catalyst is in direct mass or bulk intimate physical contact with the fuel gas to be reformed.

The fuel cell may operate at temperatures at or above about 650° C. The catalyst is capable of withstanding temperatures in the range from 600° to 700° C. in the molten carbonate environment. The catalyst is capable of performing effectively in such an environment in a fuel cell for a minimum of 5000 hours.

The Feitnecht compound is formed by a co-precipitation process comprising bringing together a mixed solution of water soluble salts of nickel and aluminum, and optionally chromium, and a precipitant solution. The mixed salt solution is preferably a mixed nitrate solution. The precipitant solution is preferably an alkaline solution such as sodium carbonate, bicarbonate or hydroxide; potassium carbonate bicarbonate or hydroxide; ammonium hydroxide or bicarbonate; or urea.

The Feitnecht compound may be coprecipitated in the presence of the clay mineral, with the stabilizing additive mixed in subsequent to the coprecipitation. Alternatively, the Feitnecht compound may be coprecipitated in the absence of the clay mineral and the clay mineral and stabilizing additive mixed in subsequent to the coprecipitation.

The resulting intimate mixture may be mixed with a cement binder prior to calcination of the mixture. Alternatively a cement binder is preferably added to the mixture after calcination. The cement binder may be a high alumina cement binder. The presence of the cement binder further strengthens the catalyst.

UK patent specification no. 2222963, the text of which is incorporated herein by reference, is directed to catalysts and catalyst precursors, and the method of preparing catalysts and catalyst precursors, such as those used in the present invention.

The invention also relates to a process for reforming hydrocarbon-containing fuel within a fuel cell as defined above, comprising contacting the catalyst with the fuel. Preferably, the fuel is a gaseous fuel containing methane, and more preferably, is a natural gas fuel.

Having generally described this invention, a further understanding can be obtained by reference to certain specific examples which are provided herein for purposes of illustration only and are not intended to be limiting unless otherwise specified.

EXAMPLES

The catalyst precursor, in the form of pellets (3.2 mm×3.2mm), was mixed with pellets of alpha-alumina doped with potassium and lithium carbonate. This mixture was then loaded into a vertically disposed, 19 mm nominal bore stainless steel test reactor constructed from Incoloy 800H, and employing a Grayloc pressure seal at the top, to form a 15 cm catalyst bed. A 2–3 cm reservoir of doped alpha-alumina was situated at the top of the catalyst bed. These sections were in turn supported at the top and bottom by beds of un-doped alpha-alumina pellets. The presence of the doped alpha-alumina pellets is a means by which environmental conditions encountered in a molten carbonate fuel cell may be simulated, i.e. at the operating temperature when the carbonate is molten and with the catalyst in unrestricted direct mass or bulk intimate physical contact with molten carbonate as opposed to having a physical barrier, shield or screen preventing such direct intimate mass or bulk contact.

Prior to commencing the steam reforming reaction, the catalyst precursor was reduced in flowing hydrogen at about 650° C. for about 24 hours to produce the catalyst.

Steam was then introduced into the reactor through the inlet at the top of the reactor, followed by a gradual introduction of desulphurised natural gas as the methane-containing fuel gas. The products emerging from the outlet at the bottom of the reactor were cooled and condensate was separated off from the product gases.

Tests were also run in the absence of carbonate in the reactor but otherwise under substantially the same operating conditions.

The runs were made over different periods of duration. Prior to a run fresh catalyst and on completion of a run discharged catalyst were submitted for analysis.

The operating conditions for the tests were:

|  | test with carbonate addition | test without carbonate addition |
|---|---|---|
| Reactor pressure (psia) | 40 | 40 |
| Catalyst bed inlet temperature (°C.) | 650 | 650 |
| Catalyst bed outlet temperature (°C.) | 650 | 650 |
| GHSV ($hr^{-1}$, dry) | 530 | 829 |
| Loading (ft3/ft2/hr) | 272 | 272 |
| Steam/dry gas ratio at reactor inlet | 2.0 | 2.0 |

Preparation of Catalyst Precursor

A solution containing 25.4 kg of anhydrous sodium carbonate in 80 liters of deionized water was heated to 75° C. 35.2 kg of nickel nitrate hexahydrate, 13.6 kg of aluminum nitrate monohydrate and 1.6 kg of chromium nitrate hexahydrate were dissolved in 80 liters of deionized water and heated to 75° C. The precursor was precipitated by slow addition of the carbonated solution to the nitrates solution at a constant temperature of 75° C., both solutions being vigorously stirred throughout. After precipitation, an aqueous slurry containing 1.7 kg of kaolin and 0.8 kg of magnesium oxide was added to the solution with stirring. The slurry was filtered and the filter cake reslurried with 140 liters of deionized water at 60° C. The process of reslurrying followed by filtration was continued until the filtrate contained less than 100 ppm by weight of sodium. The resulting material was dried at 125° C. and then calcined at 450° C. for two hours to give the calcined precursor. The calcined precursor was ground to pass a 850 micron sieve, then mixed with 4.95 kg of Secar 71 high alumina cement, supplied by Lafarge, as a binder to improve strength. This powder was further blended with 2% by weight of graphite and then pelleted. The pelleted catalyst precursor was steamed at atmospheric pressure at 240° C. for 16 hours and then soaked at room temperature in deionized water for over 12 hours. The pellets were dried at 125° C. and then dipped in a solution containing 2% by weight of potassium hydroxide.

Tables 1 and 2, below, show typical results of chemical analyses on samples of fresh catalyst and discharged catalyst from different positions down the bed after runs of 1000 hours duration conducted with carbonates present (Table 1) and carbonates not present (Table 2) in the reactor. Tables 1 and 2 also show, with respect to both the fresh catalyst and discharged catalyst, samples of typical results of the following physical analyses: BET surface area measurements, X-ray diffraction investigations and nickel surface area determinations.

TABLE 1

CHEMICAL AND PHYSICAL ANALYSES OF THE LH CATALYST DISCHARGED FROM A RUN IN PRESENCE OF A CARBONATE

| Position Down Catalyst Bed (cm) | 0–4 | 4–7 | 7–10 | Fresh |
|---|---|---|---|---|
| Nickel (wt %) | 34.7 | 34.6 | 37.0 | 37.5 |
| Aluminum (wt %) | 16.0 | 15.3 | 15.2 | 16.6 |
| Potassium (wt %) | 4.0 | 4.1 | 3.5 | 0.4 |
| Lithium (wt %) | 0.3 | 0.5 | 0.3 | n.d. |
| Silicon (Wt %) | 1.8 | 1.8 | 1.8 | 1.8 |
| Chromium (wt %) | 1.0 | 1.0 | 1.0 | 1.0 |
| Magnesium (wt %) | 1.8 | 1.8 | 1.8 | 1.9 |

TABLE 1-continued

CHEMICAL AND PHYSICAL ANALYSES OF THE LH CATALYST DISCHARGED FROM A RUN IN PRESENCE OF A CARBONATE

| Position Down Catalyst Bed (cm) | 0–4 | 4–7 | 7–10 | Fresh |
|---|---|---|---|---|
| Sodium (wt %) | 0.2 | 0.3 | 0.2 | 0.3 |
| Iron (Wt %) | 0.2 | 0.2 | 0.2 | 0.1 |
| Calcium (Wt %) | 5.4 | 5.2 | 5.3 | 5.6 |
| Carbon (wt %, AR*) | 2.1 | 1.9 | 1.8 | 2.7 |
| Sulphur (wt %, AR*) | 0.0 | 0.0 | 0.0 | 0.0 |
| BET Surface Area ($m^2g^{-1}$ of catalyst) | 22 | 45 | 38 | 136 |
| Ni Surface Area ($m^2g^{-1}$ of catalyst) | 7 | 8 | 7 | 22 |
| Nickel Crystallite size (Å) | 205 | 168 | 168 | n.d. |

Chemical analysis reported on an ignited basis
n.d. = not determined
*AR-As Received

TABLE 2

CHEMICAL AND PHYSICAL ANALYSES OF THE LH CATALYST DISCHARGED OF A RUN IN ABSENCE OF A CARBONATE

| Position Down Catalyst Bed (cm) | 0–4 | 4–7 | 7–10 | Fresh |
|---|---|---|---|---|
| Nickel (wt %) | 37.6 | 39.0 | 38.2 | 37.3 |
| Aluminum (wt %) | 16.8 | 16.9 | 17.1 | 16.9 |
| Potassium (wt %) | 0.4 | 0.4 | 0.3 | 0.3 |
| Lithium (wt %) | 0.0 | 0.0 | 0.0 | 0.0 |
| Silicon (Wt %) | 2.0 | 2.0 | 2.0 | 2.0 |
| Chromium (wt %) | 1.0 | 1.1 | 1.0 | 1.0 |
| Magnesium (wt %) | 1.9 | 2.0 | 1.9 | 1.9 |
| Sodium (wt %) | 0.2 | 0.3 | 0.2 | 0.3 |
| Iron (Wt %) | 0.2 | 0.2 | 0.2 | 0.1 |
| Calcium (Wt %) | 5.6 | 5.6 | 5.8 | 5.7 |
| Carbon (wt %, AR*) | 1.8 | 1.5 | 1.4 | 2.2 |
| Sulphur (wt %, AR*) | 0.02 | 0.00 | 0.00 | 0.00 |
| BET Surface Area ($m^2g^{-1}$ of catalyst) | 52 | 50 | 48 | 136 |
| Ni Surface Area ($m^2g^{-1}$ of catalyst) | 7 | 4 | 5 | 22 |
| Nickel Crystallite Size (Å) | 105 | 121 | 120 | n.d. |

Chemical analysis reported on an ignited basis
n.d. = not determined
*AR-As Received Table 3 sets out a typical composition of feed gas entering the reactor.

TABLE 3

TYPICAL FEED GAS COMPOSITION

| | |
|---|---|
| $CH_4$ (% w/w) | 93 |
| $C_2H_6$ | 3.19 |
| $C_3H_8$ | 0.92 |
| $C_4H_{10}$ | 0.35 |
| $C_5H_{12}$ | 0.05 |
| $N_2$ | 1.9 |
| $CO_2$ | 0.55 |
| $H_2$ | n.d. |
| CO | n.d. | n.d. = Not Detected

Table 4 shows the compositions of the product gas obtained from the reactor at different times during a carbonate-present run.

TABLE 4

TYPICAL PRODUCT GAS ANALYSES

| Time (h) Gas Composition (% v/v) | 41 | 1006 |
|---|---|---|
| $CH_4$ | 11.3 | 10.3 |
| $N_2$ | 0.7 | 0.6 |
| $CO_2$ | 11.4 | 11.5 |
| $H_2$ | 68.1 | 69.1 |
| CO | 8.4 | 8.5 |
| $C_2H_6$ (vpm) | n.d. | n.d. |
| $C_3H_8$ (vpm) | n.d. | n.d. |
| $C_4H_{10}$ (vpm) | n.d. | n.d. |
| $C_5H_{12}$ (vpm) | n.d. | n.d. | n.d. = Not Detected

FIGS. 1 and 2 show temperature profiles in relation to the catalyst bed in the reactor, in the presence and absence of carbonates in the reactor, respectively.

The results shown in the Tables and the Figures indicate that the catalyst is substantially resistant to poisoning from the molten carbonate. While there is a little difference between the corresponding results for the fresh and discharged catalyst samples it is considered not to be significant. In Table 1 the chemical analysis shows that when carbonate is present in the test, the catalyst picks up (or absorbs) substantial amounts of both Li and K. Otherwise the analysis of the fresh catalyst precursor is very close to the discharged catalyst.

The profiles relating to FIGS. 1 and 2 show that the endothermic minima (or trough) associated with the steam reforming reaction zone are relatively sharp, indicating high activity, and do not move to any significant degree along the catalyst bed. This indicates that the catalyst has performed well throughout the run and suffers little or substantially no deactivation.

The results of the above tests indicate that the catalyst is active for the steam-reforming of natural gas at a typical working temperature of a molten carbonate fuel cell and is capable of operating in an environment of alkali carbonates, even though the catalyst is in direct intimate contact with the molten carbonate, for sustained periods without showing signs of any, or any significant, deactivation. Some of the reasons as to why the catalyst performs well in the molten carbonate fuel cell environment include 1) its superior mechanical strength at 650° C., and 2) the relatively high absorption by the alumina catalyst support of alkali which originates from the carbonate. The support tends to act as a sink for the alkali and thereby prevents or reduces the likelihood of the alkali from being absorbed by the active nickel particles, thus reducing the likelihood of the nickel losing some of its activity. As the reforming catalyst used in the present invention is capable of withstanding unrestricted direct mass or bulk intimate physical contact with the molten carbonate at the operating temperature of the fuel cell for a substantial length of time, it is unnecessary for the fuel cell to be provided with a barrier, screen or the like to prevent such direct intimate contact. The catalyst may, however, be physically supported on a suitable support material and/or contained within an apertured means for physically containing or locating the catalyst material.

This application is based on UK Patent Application No. 94 24886.1, filed with the UK Patent Office on Dec. 9, 1994, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A fuel cell, comprising:
   a carbonate that is in a molten state at an operating temperature of said fuel cell; and
   a reforming catalyst in physical contact with said carbonate;
   wherein said catalyst is produced by reducing a catalyst precursor, said precursor being prepared by mixing a Feitnecht compound represented by the following formula:

$$M_x^{2+}Me_y^{3+}(OH^-)_{2x+3y-2z}(A^{2-})_z \cdot nH_2O$$

wherein $Me^{2+}$ is $Ni^{2+}$,
   $Me^{3+}$ is $Al^{3+}$ or $Al^{3+}$ and $Cr^{3+}$,
   $A^{2-}$ is a single divalent anion or two monovalent anions,
   x/y is from 1.5/1 to 4/1,
   z/(x+y) is from 0.05 to 0.2, and n/(x+y) is from 0.25 to 1.0;
   with a non-calcined alumino-silicate clay mineral and at least one stabilizing additive to form a mixture, and thereafter calcining said mixture;
   wherein said stabilizing additive is selected from the group consisting of alkaline earth metal compounds, rare earth metal compounds, a mixture of an alkaline earth metal compound and a rare earth metal compound, a mixture of an alkaline earth metal compound and an alkali metal compound, a mixture of a rare earth metal compound and an alkali metal compound, and a mixture of an alkaline earth metal compound, rare earth metal compound and alkali metal compound.

2. A fuel cell as claimed in claim 1, wherein said catalyst further comprises a cement binder.

3. A fuel cell as claimed in claim 2, wherein said cement binder is a high alumina cement binder.

4. A fuel cell as claimed in claim 1, wherein said catalyst precursor is prepared from nickel nitrate hexahydrate, aluminum nitrate monohydrate, chromium nitrate hexahydrate and anhydrous sodium carbonate, wherein said almumino-silicate clay mineral is kaolin and wherein said stabilizing additive is magnesium oxide.

5. The fuel cell as claimed in claim 1, wherein said carbonate is an alkali carbonate.

6. The fuel cell as claimed in claim 5, wherein said alkali carbonate is selected from the group consisting of lithium carbonate, potassium carbonate, and mixtures thereof.

7. The fuel cell as claimed in claim 6, wherein said alkali carbonate is in pellet form, said pellet further comprising alpha-alumina.

8. The fuel cell as claimed in claim 1, wherein said catalyst precursor is reduced in flowing hydrogen gas at a temperature of about 650° C. for about 24 hours.

9. The fuel cell as claimed in claim 1, wherein said operating temperature is at least 650° C.

10. A process for reforming hydrocarbon-containing fuel comprising the step of:
    contacting a hydrocarbon-containing gaseous fuel with a reforming catalyst in a fuel cell;
    wherein said fuel cell comprises a carbonate that is in a molten state at an operating temperature;
    and wherein said catalyst is in physical contact with said carbonate and is produced by reducing a catalyst precursor, said precursor being prepared by mixing a Feitnecht compound represented by the following formula:

$$M_x^{2+}Me_y^{B+}(OH^-)_{2x+3y-2z}(A^{2-})_z \cdot nH_2O$$

wherein $Me^{2+}$ is $Ni^{2+}$,
    $Me^{3+}$ is $Al^{3+}$ or $Al^{3+}$ and $Cr^{3+}$,
    $A^{2-}$ is a single divalent anion or two monovalent anions,
    x/y is from 1.5/1 to 4/1,
    z/(x+y) is from 0.05 to 0.2, and n/(x+y) is from 0.25 to 1.0;
    with a non-calcined alumino-silicate clay mineral and at least one stabilizing additive to form a mixture, and thereafter calcining said mixture;
    wherein said stabilizing additive is selected from the group consisting of alkaline earth metal compounds, rare earth metal compounds, a mixture of an alkaline earth metal compound and a rare earth metal compound, a mixture of an alkaline earth metal compound and an alkali metal compound, a mixture of a rare earth metal compound and an alkali metal compound, and a mixture of an alkaline earth metal compound, rare earth metal compound and alkali metal compound.

11. The process as claimed in claim 10, wherein said gaseous fuel comprises methane.

12. The process as claimed in claim 10, wherein said operating temperature is at least 650° C.

13. A process for reforming hydrocarbon-containing fuel comprising the step of contacting a hydrocarbon-containing gaseous fuel with said catalyst in said fuel cell as claimed in claim 1.

\* \* \* \* \*